United States Patent [19]

Blessing

[11] 3,852,839
[45] Dec. 10, 1974

[54] TIRE TOOL
[75] Inventor: Jerry A. Blessing, DeKalb, Ill.
[73] Assignee: BLT Industries, Gilberts, Ill.
[22] Filed: Nov. 15, 1973
[21] Appl. No.: 416,166

Related U.S. Application Data
[63] Continuation-in-part of Ser. No. 279,193, Aug. 9, 1972, abandoned.

[52] U.S. Cl............... 7/8, 254/131, 29/267, 29/221.5, 73/146.8
[51] Int. Cl............... B25f 1/00, B23p 19/04
[58] Field of Search......... 73/146.8; 7/8, 8.1 R, 1 E, 7/9; 254/131; 29/267, 283; 81/15.4; 29/221.5

[56] References Cited
UNITED STATES PATENTS

| 1,689,585 | 10/1928 | Haschart | 7/9 |
| 2,679,654 | 6/1954 | Hasking | 7/1 E |
| 2,883,153 | 4/1959 | Abbott | 254/131 |
| 3,152,391 | 10/1964 | Bjorn nt ]l. | 254/131 |
| 3,793,656 | 2/1974 | Songer et al. | 7/8 |

Primary Examiner—Al Lawrence Smith
Assistant Examiner—Roscoe V. Parker
Attorney, Agent, or Firm—Wolfe, Hubbard, Leydig, Voit & Osann, Ltd.

[57] ABSTRACT

A tool for mounting and changing tires and capable of being used for prying off hubcaps, installing and removing wheel balancing weights and valve cores, installing valve stems and checking air pressure. The tool also includes means for temporarily storing valve cores and valve caps.

11 Claims, 4 Drawing Figures

TIRE TOOL

CROSS-REFERENCE TO A RELATED APPLICATION

This invention is a continuation-in-part of my application Ser. No. 279,193, filed Aug. 9, 1972 and now abandoned.

BACKGROUND OF THE INVENTION

This invention relates to a tool for use by mechanics and service station attendants when mounting pneumatic tires on the wheels of vehicles. The mounting of a tire requires the performance of several operations and often involves removal of the hubcap, changing of the valve core, installation of a valve stem, and checking of the air pressure of the newly mounted tire. In certain instances, the old wheel balancing weights are pulled from the wheel and new balancing weights are installed after the new tire has been mounted and inflated.

SUMMARY OF THE INVENTION

The general aim of the present invention is to provide a new and improved tire tool which the mechanic may use to perform most and preferably all of the aforementioned operations so as to avoid not only the need and expense of keeping separate tools for each job but also the inherent inconvenience and loss of time resulting from the use of separate tools.

A more detailed object is to provide a single tool having a unique head with which the mechanic may pry off hubcaps, pull and install wheel balancing weights, and preferably install valve stems.

Still another object is to provide a tool of the foregoing type which may be used for extracting and installing valve cores.

Further objects of the invention are to incorporate an air pressure gage in the tool itself and to provide the tool with means for storing loose valve cores and valve caps to avoid the danger of the cores and caps being lost or misplaced during mounting of the tires.

These and other objects and advantages of the invention will become more apparent from the following detailed description when taken in conjunction with the accompanying drawings.

DETAILED DESCRIPTION OF THE PREFERRED EMBODIMENTS

The present invention contemplates the provision of a novel tool 10 with which a mechanic or gas station attendant may perform many of the jobs normally incident to the mounting, changing and servicing of pneumatic tires for vehicles. In general, the tool may be used for prying hubcaps from the wheel, for installing and removing valve cores, for installing valve stems, for installing and removing wheel balancing weights and for checking the air pressure of inflated tires. The tool also may be conveniently used to store valve cores and valve caps from the time the cores and caps are removed until they are subsequently re-installed.

Figure 1:
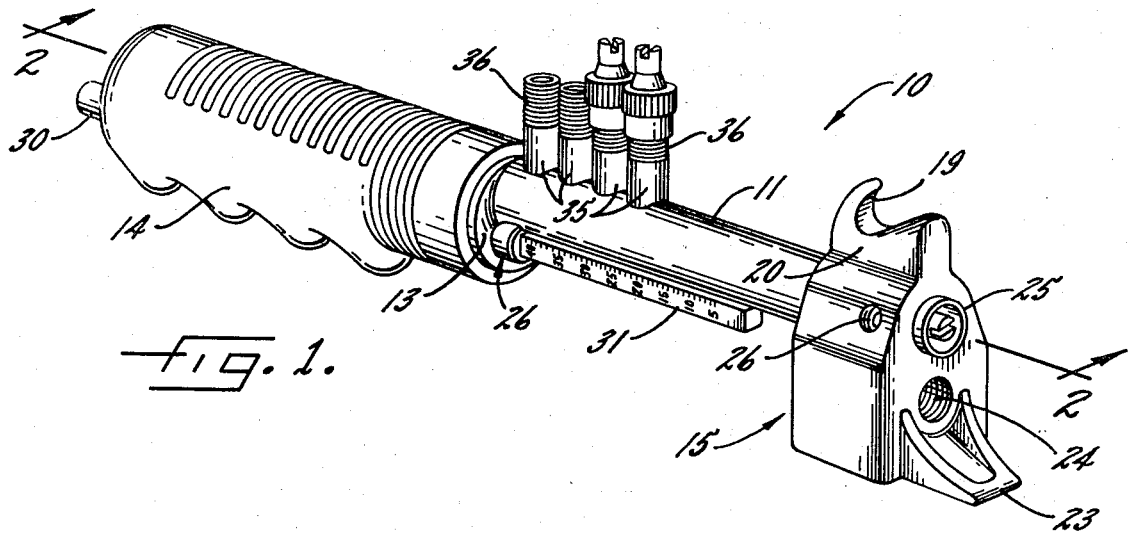
FIG. 1 is a perspective view of one embodiment of a new and improved tool incorporating the novel features of the present invention.
Figure 2:
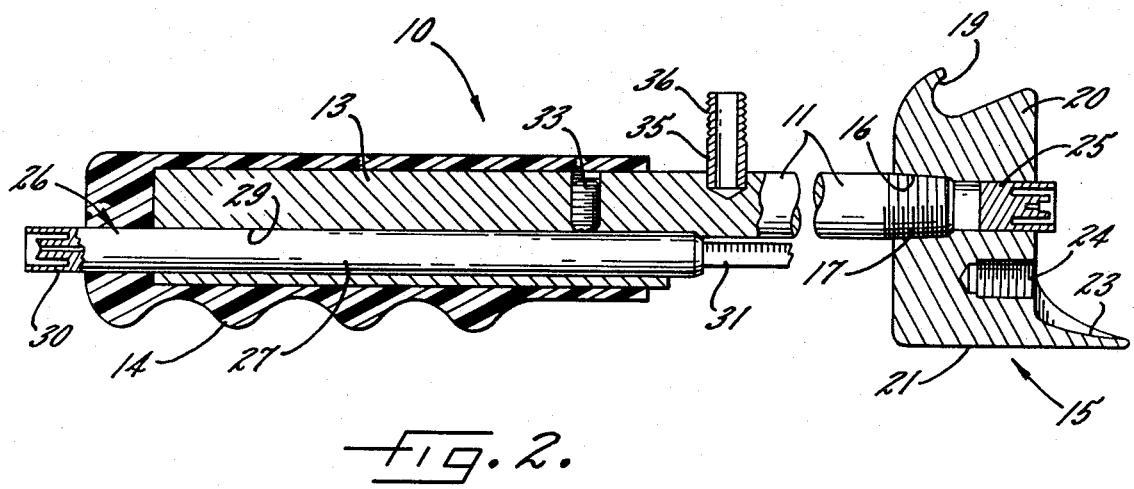
FIG. 2 is a fragmentary cross-section taken substantially along the line 2—2 of FIG. 1.

More specifically, the tool 10 shown in FIGS. 1 and 2 comprises an elongated cylindrical shank 11 made of suitable steel and formed at its inner end with an integral handle 13 which also is cylindrical. The shank is somewhat smaller in diameter than the handle and projects eccentrically therefrom such that the axis of the shank is located above the axis of the handle. A plastic handle grip 14 is telescoped removably over the handle and may be of the same type as used on the handlebars of bicycles.

Telescoped over and attached to the outer end portion of the shank 11 is a uniquely constructed head 15 which may be used to perform many of the jobs mentioned above. As shown, the head is shaped generally as a block and comprises a heavy steel forging which is formed with an axially extending hole 16. The inner end portion of the hole is threaded and is screwed onto the outer end portion of the shank, such outer end portion being externally threaded as indicated at 17 in FIG. 2. In carrying out the invention, an upwardly and outwardly opening hook 19 is formed in the upper end of a narrow extension 20 which is integral with the upper end of the head, the hook being usable by the mechanic to pull old wheel balancing weights off of the wheel. The lower end of the head is flat and defines a solid hammer face 21 which the mechanic may use to hammer on new weights and thereby clamp such weights to the wheel. Accordingly, the same tool 10 may be used both for removing and installing wheel weights as a result of the head 15 being formed with the hook 19 and the hammer face 21.

Located just above the hammer face 21 and projecting outwardly from the outer end of the head 15 is a blade-like pry 23 which may be used for pulling off the hubcap prior to removal of the wheel from the vehicle. The pry herein is formed integrally with the head, is generally triangular when viewed from the side, and includes a concavely curved upper face.

In order to facilitate the installation of a valve stem in the wheel, a threaded hole 24 is formed in the head 15 and opens out of the outer end thereof just above the pry 23. The hole 24 is sized and threaded such that the outer end of the valve stem may be screwed into the hole. After being inserted partially through the hole in the wheel, the valve stem may be turned and screwed into the threaded hole 24 in the head and then the tool 10 may be pulled endwise to draw the stem outwardly until the stem is seated tightly in the hole in the wheel. The tool then may be turned and unscrewed from the valve stem.

Removal and installation of valve cores are effected by a conventional valve core rotating element or extractor 25 which is coaxial with the shank 11. In the present instance, the valve core extractor 25 is fitted into the outer end portion of the hole 16 and is held therein by a set screw 26 (FIG. 1) extending through the head. Being coaxial with the shank, the extractor may be easily used by turning the tool 10 about its own axis after placing the extractor in engagement with the valve core.

For the purpose of checking the air pressure after inflation of the tires, a slider-type pressure gage 26 (FIG.

2) of conventional construction is incorporated in the tool 10. As shown in FIG. 2, the barrel 27 of the gage is telescoped into a hole 29 extending through the lower portion of the handle 13 and opening out of the inner and outer ends thereof. The valve stem receiving nose 30 of the gage projects beyond the outer end of the handle while the opposite end of the gage is located just outwardly of the inner end of the handle.

With the foregoing arrangement, the air pressure of a tire may be checked by telescoping the nose 30 over the valve stem and, as an incident to checking the pressure, the indicating scale 31 of the gage is forced out of the barrel 27 and slides beneath the shank 11 so that the pressure can be read at the outer end of the barrel. The gage is held in the handle 13 by a set screw 33 (FIG. 2) which may be released to enable removal and replacement of the gage if the latter should become defective.

Advantageously, means are provided for storing valve cores and caps between the times of their removal from one set of tires and their re-installation in another set. Herein, these means comprise four upright tubes 35 (FIG. 1) spaced from one another along the upper side of the shank 11 and tack welded to the latter. The upper ends of the tubes are externally threaded as indicated at 36 and are sized to threadably receive the valve caps. Removed valve cores may be placed in the tubes and then the upper ends of the tubes may be closed by the removed valve caps as shown by the two right-hand tubes illustrated in FIG. 1. Accordingly, the tubes provide the mechanic with a convenient place to store the valve cores and caps and thereby prevent their loss during the tire changing operation.

From the foregoing, it will be apparent that the present invention brings to the art a new and improved tire tool 10 which may be used to perform several jobs which formerly required separate tools. The cost of the unitized tool 10 is less than the combined cost of separate tools for performing comparable jobs and, in addition, the mechanic need not keep track of and reach for multiple tools as he performs his tasks.

Figure 3:
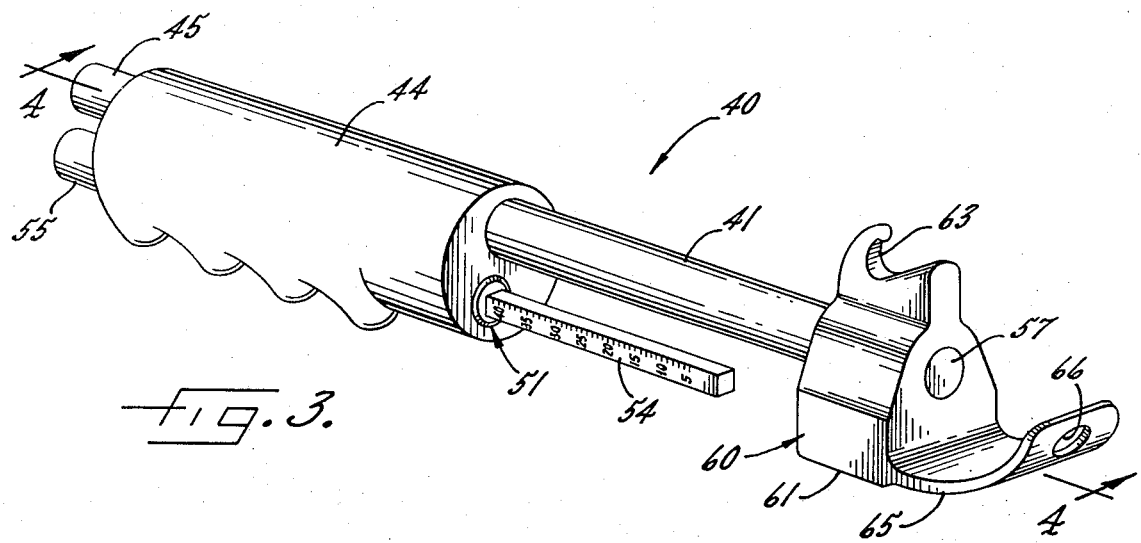
FIG. 3 is a view similar to FIG. 1 but showing another embodiment of a tool incorporating the features of the invention.

Another embodiment of a tool 40 having most of the capabilities described above is shown in FIGS. 3 and 4. In this instance, the steel shank 41 of the tool is of substantially uniform diameter throughout its entire length and is releasably press-fitted into a hole 43 formed in a solid handle grip 44 made of a firm but resilient rubber-like material. The inner end portion of the shank is reduced in diameter as indicated at 45 and projects outwardly through a reduced diameter hole 46 formed in the end of the handle grip. A shoulder 47 defined at the junction of the main shank 41 and the reduced diameter portion 45 engages a shoulder at the junctions of the holes 43 and 46 to keep the handle grip 44 from moving outwardly along the shank.

The barrel 50 of a slider-type pressure gage 51 is releasably press-fitted into a hole 53 formed in the handle grip 44 beneath the hole 43 and is positioned such that the indicating scale 54 may slide outwardly beneath the shank in the same manner as in the first embodiment of the invention. The valve stem receiving nose 55 of the gage projects outwardly through an enlarged diameter hole 56 formed in the end of the handle grip. The gage is snugly gripped by the resilient material of the handle grip and may be pulled out of the holes 53 and 56 and replaced if necessary.

Tightly pressed onto a reduced diameter outer end portion 57 of the shank 11 and abutting a shoulder 59 thereon is a forged head 60 which includes a hammer face 61 on its lower side and an integral wheel weight hook 63 on its upper side. Located just above the hammer face 61 and projecting outwardly from the outer end of the head 60 is a hubcap pry 65. Herein, the pry is comparatively long and curves upwardly upon progressing outwardly. By virtue of the length and curvature of the pry, more leverage can be obtained on a hubcap than in the case of the pry 23 of the first embodiment and, in addition, it is possible to place the pry beneath the hubcap while the tool 40 is at a greater angle relative to the wheel and to swing the tool through a longer distance before the handle grip 44 contacts the wheel.

To facilitate the installation of a valve stem in the wheel, a plain hole 66 is formed through a pry 65 near the outer end thereof. After the valve stem has been inserted partially through the hole in the wheel, the hole 66 is telescoped over the stem. Most stems are made of rubber and are tapered and thus tend to wedge into and be gripped by the edges of the hole 66. After the stem has been gripped, the tool 40 may be pulled generally endwise to draw the stem outwardly until the stem is seated tightly in the hole in the wheel. By virtue of the formation of the plain hole 66 in the pry, it is not necessary to thread the tool onto and then unthread the tool from the valve stem and thus a saving of time is effected.

Figure 4:
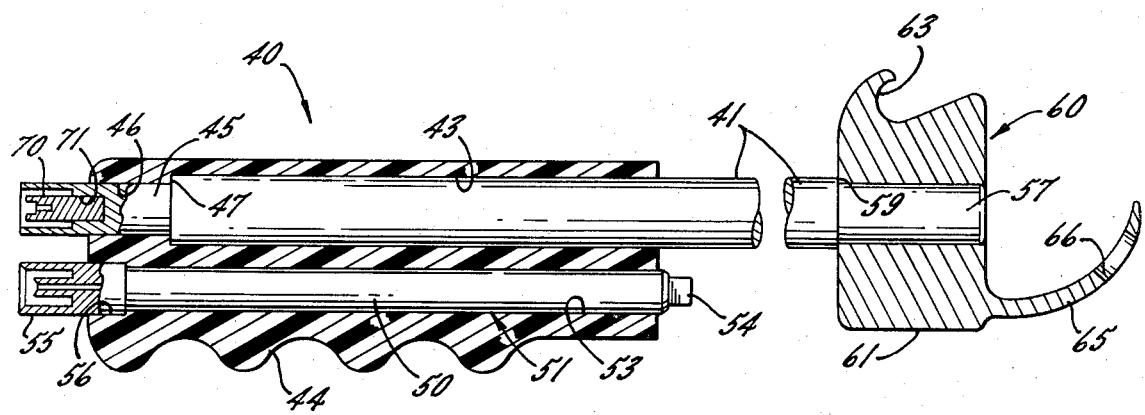
FIG. 4 is a fragmentary cross-section taken substantially along the line 4—4 of FIG. 3.

In order to install and remove valve cores, a conventional valve core rotating element or extractor 70 is located at the inner end of the shank 41. As shown in FIG. 4, the inner end portion 45 of the shank is counterbored to receive the extractor, and the latter is press-fitted into the smaller diameter hole 71 of the counterbore. Being located at the inner end of the tool 40, the extractor 70 may be telescoped into a valve stem and turned without any interference from the hubcap pry 65.

It will be apparent from the foregoing that the tool 40 may be manufactured easier and less expensively than the tool 10. Also, the different arrangement of the hubcap pry 65, the valve stem hole 66 and the valve core extractor 70 makes the tool 40 more convenient and effective to use.

I claim as my invention:

1. A tire tool comprising an elongated shank, a handle on one end of said shank, a metal head on the opposite end of said shank, said head having an inner end facing said handle and an oppositely facing outer end and also having upper and lower ends, a wheel weight hook formed integrally with said head and opening upwardly and outwardly from the upper end thereof, a substantially flat surface formed on the lower end of said head and defining a hammer face, a hubcap pry rigid with and projecting outwardly from the outer end of said head adjacent said hammer face, a threaded valve stem hole formed in said head and opening out of the outer end thereof above said pry, and a valve core rotating element coaxial with said shank and located between said hook and said pry, said valve core rotating element being connected to turn with said shank and being located adjacent the outer end of said head.

2. A tire tool as defined in claim 1 in which said valve core rotating element is fitted into a hole in the outer end portion of said head, and means for releasably anchoring said element in said last-mentioned hole.

3. A tire tool as defined in claim 1 in which said handle is formed with a larger cross-sectional dimension than said shank, a hole formed in said handle below said shank and extending from an inner end of said handle to an outer end thereof, and an air pressure gage telescoped into said last-mentioned hole and fastened to said handle, said air gage having a valve stem receiving nose located at the outer end of said handle and having a reciprocable pressure indicating scale located to shift outwardly from the inner end of said handle in underlying relation with said shank.

4. A tire tool as defined in claim 3 further including at least four tubes secured to and projecting from one side of said shank for storing loose valve cores, said tubes having externally threaded free ends for threadably receiving valve caps.

5. A tire tool comprising an elongated shank, a handle on one end of said shank, a metal head on the opposite end of said shank, said head having an inner end facing said handle and an oppositely facing outer end and also having upper and lowr ends, a substantially flat surface formed on one of the upper and lower ends of said head and defining a hammer face, a valve core rotating element coaxial with said shank and located adjacent the outer end of said head, and a threaded valve stem hole formed in said head between said hammer face and said valve core rotating element and opening out of the outer end of said head.

6. A tire tool comprising an elongated shank, a handle on one end portion of said shank, a metal head on the opposite end portion of said shank, said head having an inner end facing said handle and an oppositely facing outer end and also having upper and lower ends, a hammer face defined on the lower end of said head, a wheel weight remover on the upper end of said head, a hole formed in said handle and extending from the inner end of said handle to the outer end thereof, and an air pressure gage telescoped into said hole, said air gage having a valve stem receiving nose located at the outer end of said handle and having a reciprocable pressure indicating scale located to shift outwardly from the inner end of said handle and alongside said shank.

7. A tire tool as defined in claim 6 further including a valve core rotating element located adjacent one end of said shank.

8. A tire tool as defined in claim 7 in which said valve core rotating element is located adjacent the outer end of said shank and the outer end of said handle.

9. A tire tool as defined in claim 7 in which said valve core rotating element is located adjacent the outer end of said shank and the outer end of said head.

10. A tire tool as defined in claim 8 further including a hubcap pry rigid with and projecting outwardly from the outer end of said head adjacent said hammer face, said pry curving upwardly upon progressing outwardly.

11. A tire tool as defined in claim 10 further including a hole formed through said pry and sufficiently large to telescope over a valve stem.

* * * * *